(12) United States Patent
Kaneki

(10) Patent No.: US 6,731,918 B1
(45) Date of Patent: May 4, 2004

(54) SIGNAL STRENGTH DETECTING DEVICE WITH LITTLE TEMPERATURE DEPENDENCE

(75) Inventor: Kazuo Kaneki, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/431,928

(22) Filed: Nov. 2, 1999

(30) Foreign Application Priority Data

Jun. 21, 1999 (JP) ............................................ 11-173946

(51) Int. Cl.[7] .............................................. H04B 17/00
(52) U.S. Cl. ..................... 455/226.1; 327/351; 327/352
(58) Field of Search .......................... 455/226.2, 226.1, 455/226.3, 226.4, 232.1, 127, 116, 91, 95, 115; 327/350, 351, 352, 359, 361, 561, 563, 83, 512; 330/254, 310, 98–100, 133

(56) References Cited

U.S. PATENT DOCUMENTS

| | | | | |
|---|---|---|---|---|
| 4,578,820 A | * | 3/1986 | Highton | 330/257 |
| 4,620,114 A | * | 10/1986 | Moon | 324/131 |
| 5,481,218 A | * | 1/1996 | Nordholt et al. | 327/350 |
| 5,677,561 A | * | 10/1997 | Jensen | 257/469 |
| 5,790,943 A | * | 8/1998 | Fotowat-Ahmady et al. | 455/226.2 |
| 5,828,329 A | * | 10/1998 | Burns | 323/315 |
| 5,839,060 A | * | 11/1998 | Kasperkovitz et al. | 327/351 |
| 5,900,781 A | * | 5/1999 | Igarashi et al. | 330/254 |
| 5,910,751 A | * | 6/1999 | Winn et al. | 327/512 |
| 6,049,251 A | * | 4/2000 | Meyer | 330/124 R |
| 6,078,795 A | * | 6/2000 | Miyazaki | 455/226.2 |
| 6,084,471 A | * | 7/2000 | Ruth et al. | 327/346 |
| 6,084,472 A | * | 7/2000 | Gilbert | 327/359 |
| 6,084,473 A | * | 7/2000 | Nauta et al. | 327/359 |
| 6,259,901 B1 | * | 7/2001 | Shinomiya et al. | 330/133 |
| 6,313,704 B1 | * | 11/2001 | Maruyama et al. | 327/307 |

\* cited by examiner

*Primary Examiner*—Pablo N. Tran
(74) *Attorney, Agent, or Firm*—Burns, Doane, Swecker & Mathis, L.L.P.

(57) ABSTRACT

A signal strength detecting device includes a logarithmic amplifier and an amplitude detector. A constant current source whose current is proportional to the absolute temperature is used as a current source for biasing the logarithmic amplifier. In contrast, a constant current source whose current is not proportional to the absolute temperature is used as a current source for biasing the amplitude detector. This makes it possible to solve a problem of a conventional signal strength detecting device of being unable to detect the signal strength of a received signal correctly because it employs a constant current source whose current is proportional to the absolute temperature as the current source for biasing the amplitude detector, and hence the collector current output from differential amplifiers constituting the amplitude detector can vary in response to the absolute temperature even if the signal strength of the received signal is kept constant.

5 Claims, 6 Drawing Sheets

FIG.2

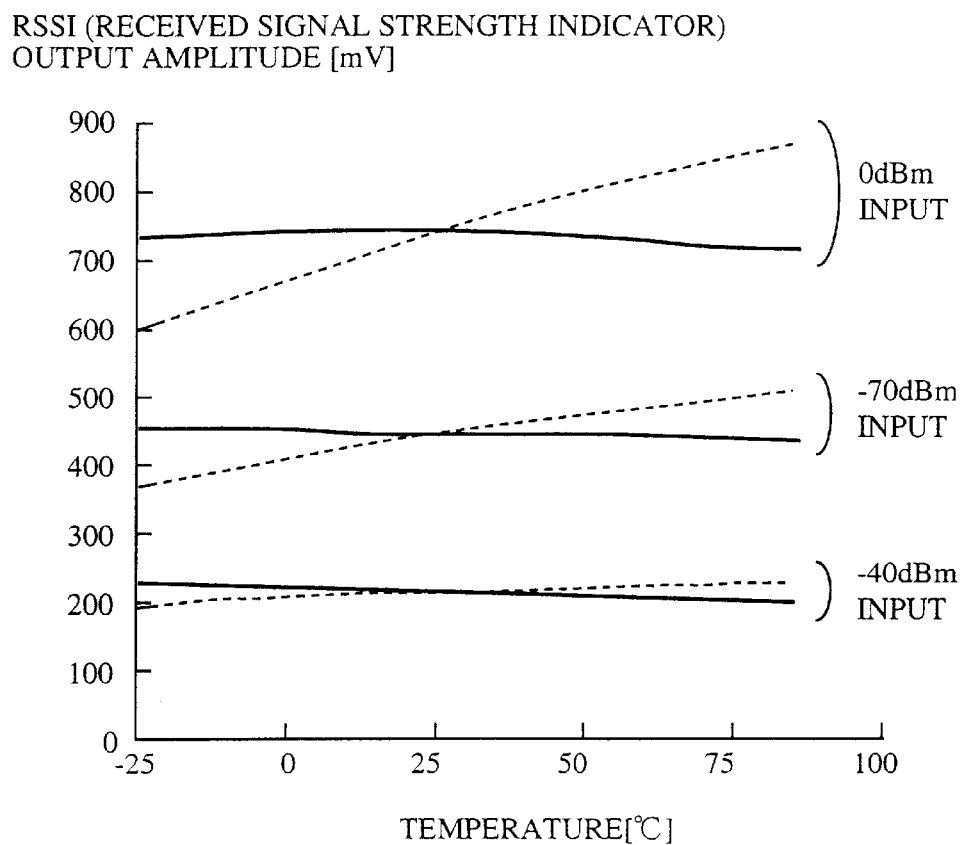

------- CONVENTIONAL DEVICE THAT EMPLOYS CURRENT SOURCE WITH CURRENT CHARACTERISTIC PROPORTIONAL TO ABSOLUTE TEMPERATURE FOR BOTH LOGARITHMIC AMPLIFIER AND DIFFERENTIAL AMPLIFIER

——— EMBODIMENT 1 THAT EMPLOYS CURRENT SOURCE WITH CURRENT CHARACTERISTIC PROPORTIONAL TO ABSOLUTE TEMPERATURE FOR LOGARITHMIC AMPLIFIER, AND CURRENT SOURCE WITH CURRENT CHARACTERISTIC INDEPENDENT OF TEMPERATURE FOR DIFFERENTIAL AMPLIFIER

SIGNAL STRENGTH DETECTING DEVICE WITH LITTLE TEMPERATURE DEPENDENCE

BACKGROUND OF THE INVENTION

1. Field of the Invention

The present invention relates to a signal strength detecting device mounted on a radio communications apparatus for detecting the signal strength of a signal received by an antenna.

2. Description of Related Art

A large number of radio communications apparatuses incorporate a signal strength detecting device for detecting the signal strength of a signal received by an antenna.

In particular, in a mobile communications system employing a CDMA (Code Division Multiple Access) scheme, a base station and a mobile station each detect the signal strength of a signal transmitted from their party, so as to precisely control the strength of a signal to be transmitted to the party in accordance with the signal strength.

For example, when the base station and mobile station are far away from each other, since the signal strength of the received signal is weak, the strength of the transmitted signal is increased so that the party can receive the transmitted signal with sufficient intensity.

In contrast with this, when the base station and mobile station are close to each other, since the signal strength of the received signal is strong, the strength of the transmitted signal is reduced so that it does not interfere radio signals from other base stations or mobile stations.

FIG. 6 is a circuit diagram showing a conventional signal strength detecting device. In FIG. 6, the reference numeral 1 designates a logarithmic amplifier for amplifying a signal received by an antenna; 2 designates an input terminal for supplying the signal received by the antenna; 3–5 each designate a differential amplifier for amplifying the received signal supplied from the input terminal 2; 6–8 each designate a transistor constituting the differential amplifiers 3–5; 9–11 each designates an emitter follower for regulating the DC level of the received signal amplified by the differential amplifiers 3–5; and 12 designates a current source for biasing the logarithmic amplifier 1. The current source 12 is a constant current source whose current is proportional to the absolute temperature.

The reference numeral 21 designates an amplitude detector for detecting the signal strength of the received signal by comparing the received signal whose DC level is regulated by the emitter followers 9–11 of the logarithmic amplifier 1 with a reference voltage; 22 designates a reference voltage generator for generating the fixed reference voltage; 23–25 each designate a differential amplifier for comparing the received signal whose DC level is regulated by one of the emitter followers 9–11 of the logarithmic amplifier 1 with the reference voltage generated by the reference voltage generator 22, and for producing a collector current proportional to the difference between the two; 26–28 each designate a transistor constituting the differential amplifiers 23–25; 29 designates a capacitor for smoothing the collector current output from the differential amplifiers 23–25; 30 designate a PNP current mirror circuit for inverting the polarity of the collector current smoothed by the capacitor 29; 31 designates a resistor for converting the collector current to a voltage signal; 32 designates an output terminal for producing the voltage signal indicating the signal strength of the received signal; and 33 designates a current source for biasing the amplitude detector 21. The current source 33 is a fixed current source whose current is proportional to the absolute temperature.

Next, the operation of the conventional signal strength detecting device will be described.

First, when the signal received by the antenna is supplied to the input terminal 2, the differential amplifier 3 of the logarithmic amplifier 1 amplifies the received signal.

The received signal amplified by the differential amplifier 3 is output from the collectors of the transistors 6 and 7. The received signal output from the collector of the transistor 6 is subjected to the DC component regulation by the emitter follower 9, and then supplied to the differential amplifier 23 of the amplitude detector 21 as well as to the transistor 6 of the post-stage differential amplifier 4. On the other hand, the received signal output from the collector of the transistor 7 is supplied to the transistor 7 of the post-stage differential amplifier 4.

Receiving the received signal output from the differential amplifier 3, the differential amplifier 4 of the logarithmic amplifier 1 further amplifies the received signal.

The received signal amplified by the differential amplifier 4 is output from the collectors of the transistors 6 and 7. The received signal output from the collector of the transistor 6 is subjected to the DC component regulation by the emitter follower 10, and then supplied to the differential amplifier 24 in the amplitude detector 21 as well as to the transistor 6 in the post-stage differential amplifier 5. On the other hand, the received signal output from the collector of the transistor 7 is supplied to the transistor 7 in the post-stage differential amplifier 5.

Receiving the received signal output from the differential amplifier 4, the differential amplifier 5 in the logarithmic amplifier 1 further amplifies the received signal.

The received signal amplified by the differential amplifier 5 is output from the collector of the transistor 6. The received signal output from the collector of the transistor 6 is subjected to the DC current regulation by the emitter follower 11, and then supplied to the differential amplifier 25 in the amplitude detector 21.

Receiving the received signal amplified by the differential amplifiers 3–5 in the logarithmic amplifier 1, the differential amplifiers 23–25 in the amplitude detector 21 compare the received signal with the reference voltage generated by the reference voltage generator 22, and output the collector currents $I_c$ proportional to the difference between the two.

The collector currents $I_c$ output from the differential amplifiers 23–25 are smoothed by the capacitor 29, undergo the polarity inversion by the PNP current mirror circuit 30, and are converted by the resistor 31 to a voltage signal (that indicates the signal strength of the received signal) to be output from the output terminal 32.

Here, the reason will be described for using the fixed current source proportional to the absolute temperature as the current source 12 for biasing the logarithmic amplifier 1.

First, the gain characteristic of the differential amplifiers 3–5 in the logarithmic amplifier 1 is given by the following expression.

$$G = (q \cdot I/k \cdot T) \cdot R_L$$

where G is the gain, q is the elementary charge, I is the magnitude of the collector current, k is the Boltzmann constant, T is the absolute temperature, and $R_L$ is a load resistance.

If the logarithmic amplifier 1 is biased by a current source without temperature dependence, the collector current I will be fixed, and the gain G of the differential amplifiers 3–5 will be reduced in inverse proportion to the absolute temperature T.

However, this will reduce the gain G of the differential amplifiers 3–5, making it impossible to amplify the received signal to a desired level. Accordingly, the collector current I must be made proportional to the absolute temperature T.

In view of this, the fixed current source with temperature dependence is used to provide the logarithmic amplifier 1 with the bias current proportional to the absolute temperature T.

Thus, the conventional signal strength detecting device with the foregoing configuration can amplify the received signal by means of the logarithmic amplifier 1 without being affected by temperature change. However, since the current source 33 for biasing the amplitude detector 21 also consists of the constant current source whose current is proportional to the absolute temperature T, even if the signal strength of the received signal is kept constant, the change in the absolute temperature T will vary the collector current $I_c$ output from the differential amplifiers 23–25. This presents a problem of hindering accurate detection of the signal strength of the received signal.

SUMMARY OF THE INVENTION

The present invention is implemented to solve the foregoing problem. It is therefore an object of the present invention to provide a signal strength detecting device capable of detecting the signal strength of a received signal accurately without being affected by the temperature change.

According to one aspect of the present invention, there is provided signal strength detecting device comprising: an amplifier for amplifying a received signal received by an antenna; a strength detector for detecting signal strength of the received signal by comparing the received signal amplified by the amplifier with a reference voltage; a first current source for biasing the amplifier; and a second current source for biasing the strength detector, wherein temperature characteristic of the second current source differs from that of the first current source.

Here, the first current source may consist of a fixed current source whose current is proportional to absolute temperature, and the second current source may consist of a constant current source whose current is not proportional to the absolute temperature.

The amplifier may comprise differential amplifiers, at least one of two outputs of each of the differential amplifiers being connected to an emitter follower.

The amplifier may comprise differential amplifiers, at least one of two outputs of an initial stage of the differential amplifiers being connected to an emitter follower.

BRIEF DESCRIPTION OF THE DRAWINGS

FIG. 2 is a graph comparatively illustrating the output amplitude of the signal produced from the output terminal of the conventional signal strength detecting device, and the output amplitude of the signal produced from the output terminal of the embodiment 1 of the signal strength detecting device;

DETAILED DESCRIPTION OF THE PREFERRED EMBODIMENTS

The invention will now be described with reference to the accompanying drawings.

EMBODIMENT 1

Figure 1:
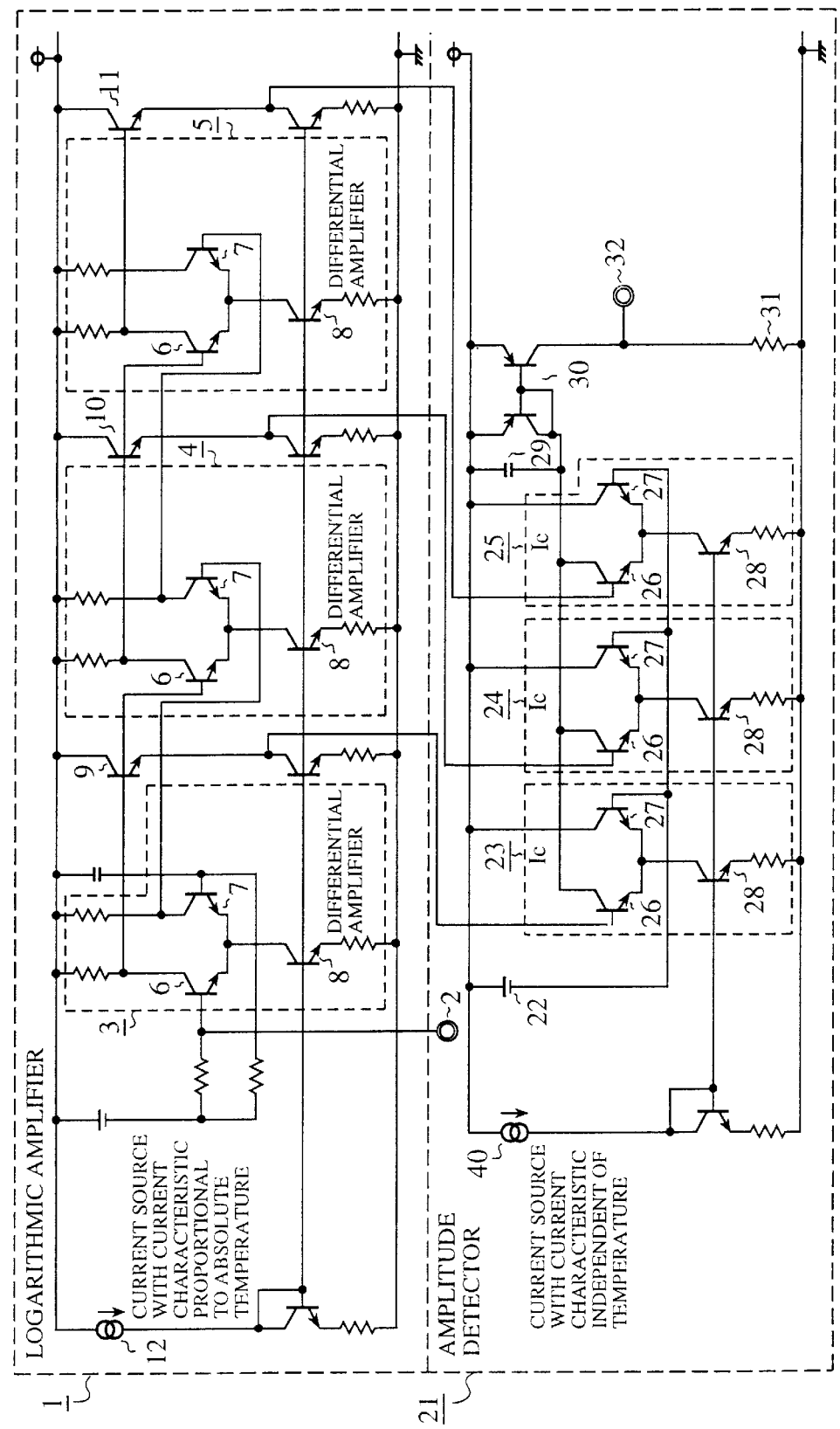
FIG. 1 is a circuit diagram showing an embodiment 1 of the signal strength detecting device in accordance with the present invention.

FIG. 1 is a circuit diagram showing an embodiment 1 of the signal strength detecting device in accordance with the present invention. In FIG. 1, the reference numeral 1 designates a logarithmic amplifier for amplifying a signal received by an antenna; 2 designates an input terminal for supplying the signal received by the antenna; 3–5 each designate a differential amplifier for amplifying the received signal supplied from the input terminal 2; 6–8 each designate a transistor constituting the differential amplifiers 3–5; 9–11 each designates an emitter follower for regulating the DC level of the received signal amplified by the differential amplifiers 3–5; and 12 designates a current source for biasing the logarithmic amplifier 1. The current source 12 is a constant current source whose current is proportional to the absolute temperature.

The reference numeral 21 designates an amplitude detector for detecting the signal strength of the received signal by comparing the received signal whose DC level is regulated by the emitter followers 9–11 in the logarithmic amplifier 1 with a reference voltage; 22 designates a reference voltage generator for generating the fixed reference voltage; 23–25 each designate a differential amplifier for comparing the received signal whose DC level is regulated by the emitter followers 9–11 in the logarithmic amplifier 1 with the reference voltage generated by the reference voltage generator 22, thereby producing a collector current proportional to the difference between the two; 26–28 each designate a transistor constituting the differential amplifiers 23–25; 29 designates a capacitor for smoothing the collector current output from the differential amplifiers 23–25; 30 designate a PNP current mirror circuit for inverting the polarity of the collector current smoothed by the capacitor 29; 31 designates a resistor for converting the collector current to a voltage signal; 32 designates an output terminal for producing the voltage signal indicating the signal strength of the received signal; and 40 designates a current source for biasing the amplitude detector 21. The current source 40 is a fixed current source without the temperature dependence, whose current is not proportional to the absolute temperature.

Next, the operation of the present embodiment 1 will be described.

First, when the signal received by the antenna is supplied to the input terminal 2, the differential amplifier 3 in the logarithmic amplifier 1 amplifies the received signal.

The received signal amplified by the differential amplifier 3 is output from the collectors of the transistors 6 and 7. The received signal output from the collector of the transistor 6 is subjected to the DC component regulation by the emitter follower 9, and then supplied to the differential amplifier 23 in the amplitude detector 21 as well as to the transistor 6 of the post-stage differential amplifier 4. On the other hand, the received signal output from the collector of the transistor 7 is supplied to the transistor 7 of the post-stage differential amplifier 4.

Receiving the received signal output from the differential amplifier 3, the differential amplifier 4 in the logarithmic amplifier 1 further amplifies the received signal.

The received signal amplified by the differential amplifier 4 is output from the collectors of the transistors 6 and 7. The received signal output from the collector of the transistor 6 is subjected to the DC component regulation by the emitter follower 10, and then supplied to the differential amplifier 24 in the amplitude detector 21 as well as to the transistor 6 of the post-stage differential amplifier 5. On the other hand, the received signal output from the collector of the transistor 7 is supplied to the transistor 7 of the post-stage differential amplifier 5.

Receiving the received signal output from the differential amplifier 4, the differential amplifier 5 in the logarithmic amplifier 1 further amplifies the received signal.

The received signal amplified by the differential amplifier 5 is output from the collector of the transistor 6. The received signal output from the collector of the transistor 6 is subjected to the DC current regulation by the emitter follower 11, and then supplied to the differential amplifier 25 in the amplitude detector 21.

Receiving the received signal amplified by the differential amplifiers 3–5 in the logarithmic amplifier 1, the differential amplifiers 23–25 in the amplitude detector 21 compare the received signal with the reference voltage generated by the reference voltage generator 22, and output the collector current $I_c$ proportional to the difference between the two.

The collector current $I_c$ output from the differential amplifiers 23–25 is smoothed by the capacitor 29, undergoes the polarity inversion by the PNP current mirror circuit 30, and is converted by the resistor 31 to a voltage signal (that indicates the signal strength of the received signal) to be output from the output terminal 32.

Although the foregoing operation is the same as that of the conventional device, the present embodiment 1 differs from the conventional device in that it employs a temperature independent constant current source as the current source 40 for biasing the amplitude detector 21.

Employing the temperature independent constant current source as the current source 40 for biasing the amplitude detector 21 makes it possible to detect the signal strength of a received signal accurately. This is because the collector current $I_c$ output from the differential amplifiers 23–25 does not vary as long as the signal strength of the received signal is kept constant, even if the absolute temperature T changes.

FIG. 2 is a graph comparatively illustrating the output amplitude (mV) of the signal produced from the output terminal 32 of the conventional signal strength detecting device, and the output amplitude (mV) of the signal produced from the output terminal 32 of the present embodiment 1 of the signal strength detecting device.

As clearly seen from FIG. 2, even if the signal strength of the received signal is constant, the conventional signal strength detecting device outputs the signal whose output amplitude is less than the correct value in a temperature range lower than 25 degrees Celsius, whereas whose output amplitude is higher than the correct value in a temperature range higher than 25 degrees Celsius.

In contrast with this, in the present embodiment 1 of the signal strength detecting device, the signal varies little as long as the signal strength of a received signal is constant, even if the temperature changes.

As described above, the present embodiment 1 is configured such that the current source 12 for biasing the logarithmic amplifier 1 consists of a constant current source whose current changes in proportion to the absolute temperature T, whereas the current source 40 for biasing the amplitude detector 21 consists of a constant current source whose current is independent of the absolute temperature T. This offers an advantage of being able to detect the signal strength of a received signal accurately without being affected by the temperature change.

EMBODIMENT 2

Figure 3:
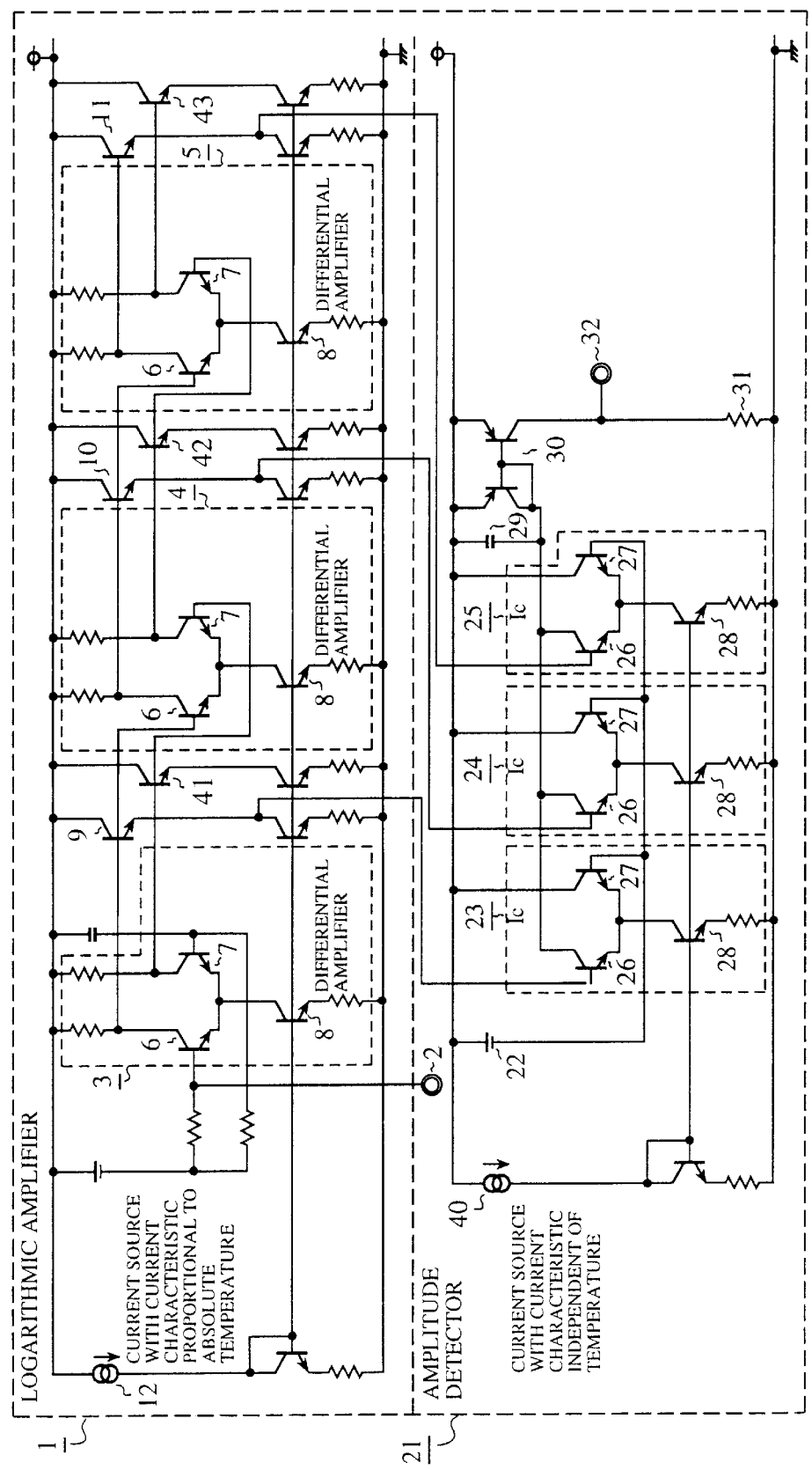
FIG. 3 is a circuit diagram showing an embodiment 2 of the signal strength detecting device in accordance with the present invention.

FIG. 3 is a circuit diagram showing an embodiment 2 of the signal strength detecting device in accordance with the present invention. In FIG. 3, the same reference numerals designate the same or like portions to those of FIG. 1, and the description thereof is omitted here.

Reference numerals 41–43 each designates an emitter follower for regulating the DC level of the received signal amplified by the differential amplifiers 3–5.

Next, the operation of the present embodiment 2 will be described.

The emitter followers 9–11 are each connected to a first one of the two outputs of each of the differential amplifiers 3–5 in the foregoing embodiment 1, and the two outputs of each of the differential amplifiers 3–5 are unbalanced in this case. This can reduce a power supply rejection ratio (PSRR), and hence is likely to increase power supply noise placed on signal lines.

Therefore, when the power supply noise is large and the signal level is low, the received signal is likely to be buried in the power supply noise, and the received signal will not be amplified correctly.

In view of this, in the present embodiment 2, the emitter followers 41–43 are each connected to a second one of the two outputs of each of the differential amplifiers 3–5, while the emitter followers 9–11 are each connected to the first output of each of the differential amplifiers 3–5, which can improve the PSRR.

This offers an advantage of being able to amplify minute signals correctly even in the condition of large power supply noise.

Figure 4:
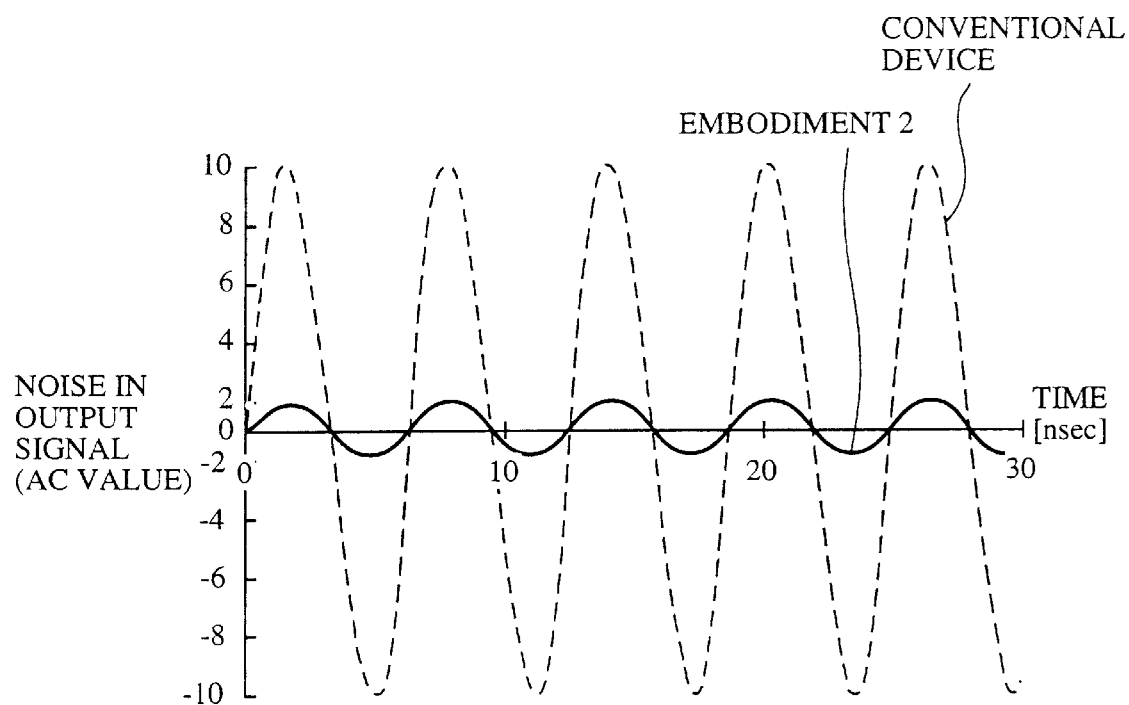
FIG. 4 is a graph illustrating the degree of influence of power supply noise.

FIG. 4 is a graph illustrating the degree of effect of the power supply noise, which is plotted based on simulation results.

The graph illustrates a plot of magnitudes of pseudo noise that appears at the output of the logarithmic amplifier 1, when a sine wave (pseudo power supply noise) is added on a power supply line.

The result of the present embodiment 2 indicates that the wraparound noise from the power supply can be greatly reduced as compared with the result of the conventional device.

EMBODIMENT 3

Figure 5:
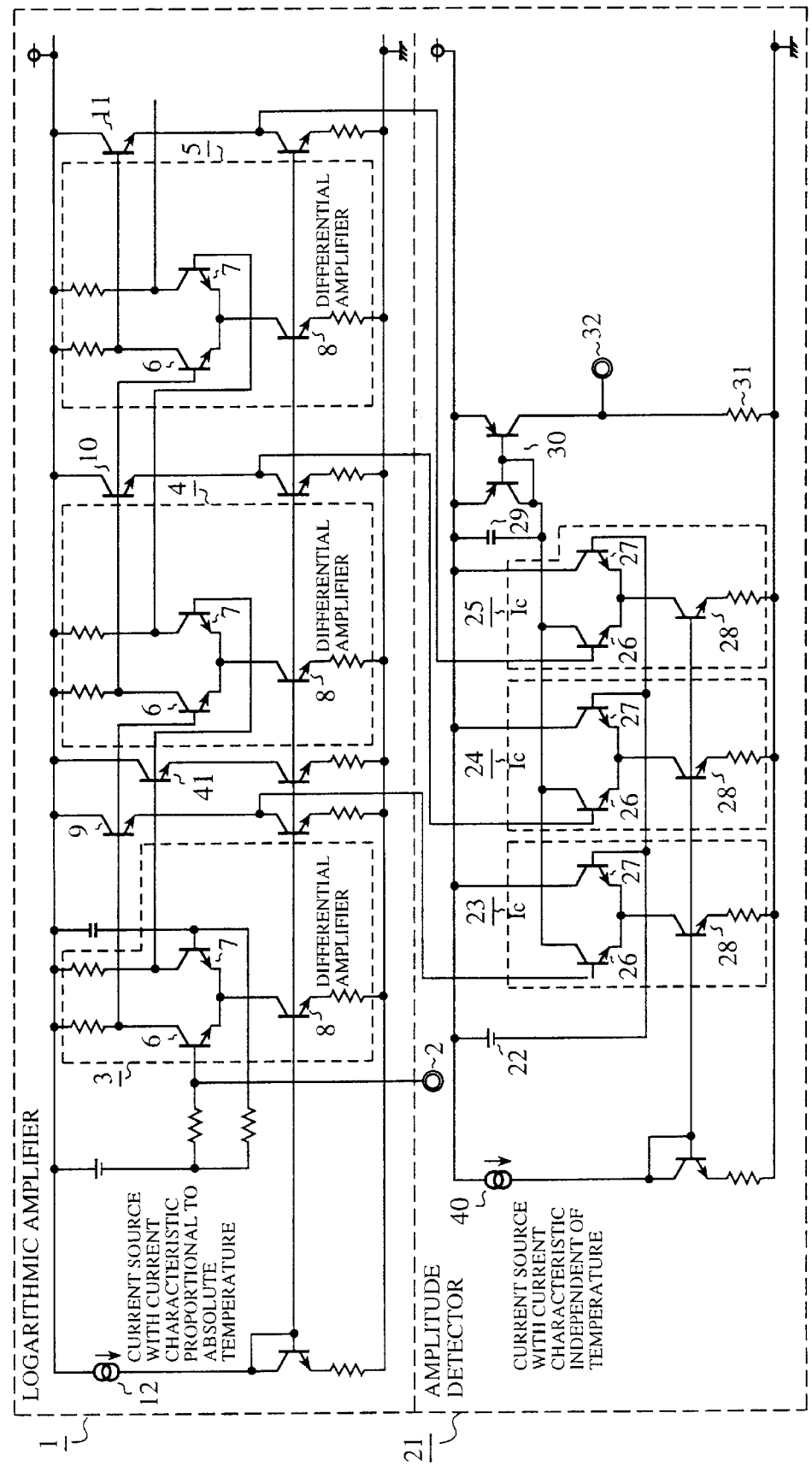
FIG. 5 is a circuit diagram showing an embodiment 3 of the signal strength detecting device in accordance with the present invention.
Figure 6:
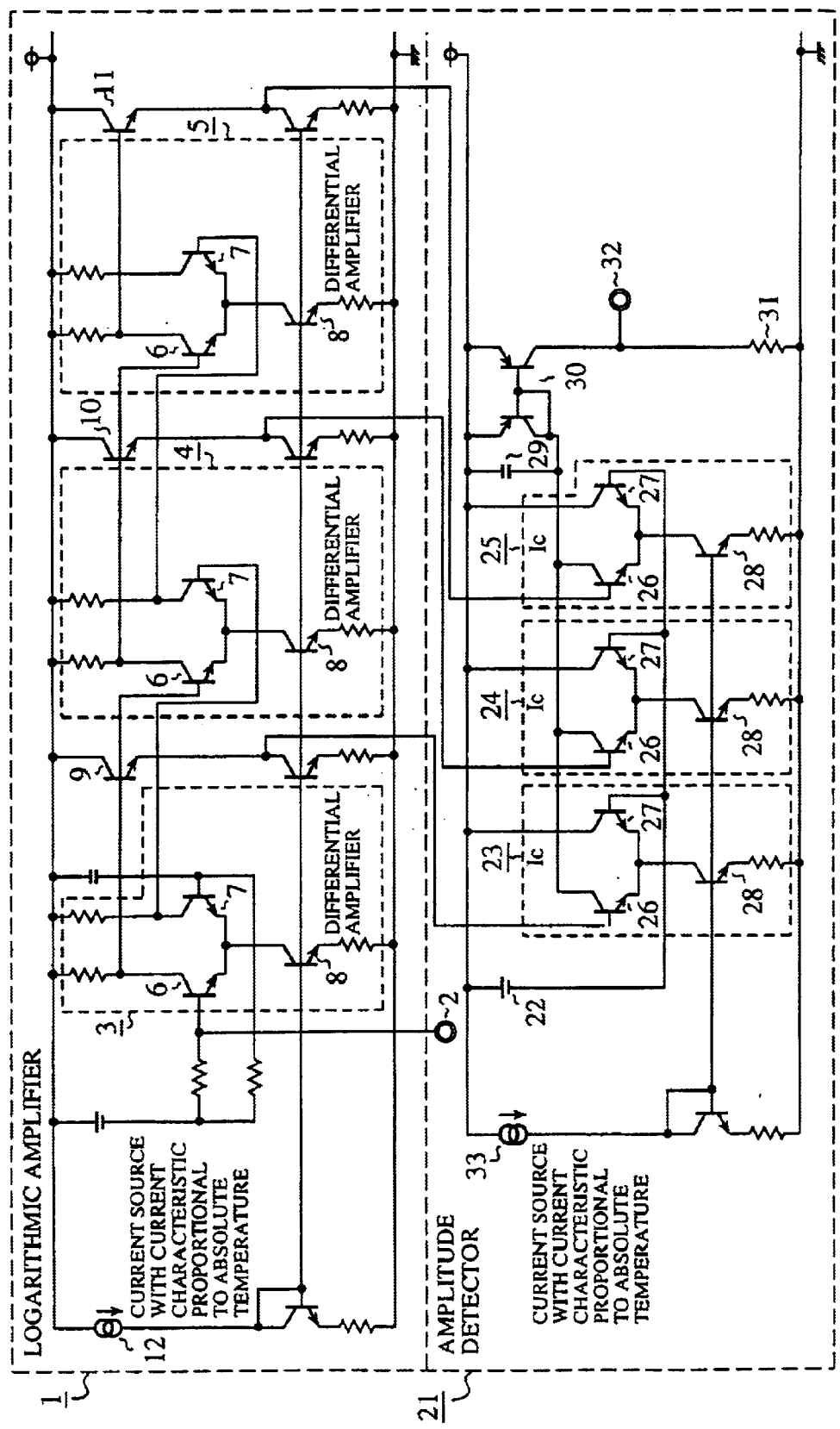
FIG. 6 is a circuit diagram showing a conventional signal strength detecting device.

Although the emitter followers 41–43 are connected to the second outputs of the differential amplifiers 3–5 in the foregoing embodiment 2, only the emitter follower 41 can be connected to the second output of the differential amplifier 3 without connecting any emitter follower to the second outputs of the differential amplifiers 4 and 5 as shown in FIG. 5.

More specifically, since the differential amplifier 3, the initial stage amplifier, handles the minute received signal, it is connected to the emitter follower 41 to improve the PSRR. However, since the differential amplifiers 4 and 5, the second and the following stage amplifiers, handle the received signal amplified to some extent by the differential amplifier 3, they will not significantly degrade the PSRR even without the emitter followers 42 and 43.

In view of this, the emitter follower 41 is connected to only the second output of the differential amplifier 3 in the present embodiment 3. This enables the current consumption to be reduced as compared with the foregoing embodiment 2.

Although the logarithmic amplifier 1 and amplitude detector 21 each include three differential amplifiers in the foregoing embodiments 1–3, this is not essential. For example, four or more stage differential amplifiers can be employed to increase the range or the like of the signal strength detecting device.

What is claimed is:

1. A signal strength detecting device comprising:

an amplifier for amplifying a received signal received by an antenna;

a strength detector for detecting signal strength of the received signal by comparing the received signal amplified by said amplifier with a reference voltage;

a first current source for biasing said amplifier , a current of said first current source being proportional to absolute temperature; and a second current source for biasing the strength detector, a current of said second current source not being proportional to absolute temperature.

2. The signal strength detecting device according to claim 1, wherein said amplifier comprises differential amplifiers, outputs of at least one of said differential amplifiers being connected to respective emitter followers.

3. The signal strength detecting device according to claim 1, wherein said amplifier comprises differential amplifiers, in which each of two outputs of an initial stage of said differential amplifiers being connected to an emitter follower respectively.

4. A signal strength detecting device comprising:

a logarithmic amplifier including a first differential amplifier for amplifying a received signal, a first current source for biasing said first differential amplifier, and first and second emitter followers respectively connected to first and second outputs of said first differential amplifier; and an amplitude detector including (i) a strength detector for detecting signal strength of the received signal by comparing the received signal amplified by said logarithmic amplifier with a reference voltage, and (ii) a second current source for biasing said strength detector, said second current source having a temperature characteristic different from that of said first current source.

5. The signal strength detecting device according to claim 4, wherein said strength detector includes a second differential amplifier receiving an output of said first emitter follower and the reference voltage.

* * * * *